United States Patent
Baker et al.

[11] Patent Number: 6,123,267
[45] Date of Patent: Sep. 26, 2000

[54] AIR CONDITIONERS FOR VEHICLES

[75] Inventors: Roger Keith Baker, Solihull, United Kingdom; Teruhisa Tanaka, Aichi, Japan

[73] Assignee: Land Rover Group Ltd., Warwick, United Kingdom

[21] Appl. No.: 09/117,627

[22] PCT Filed: Dec. 4, 1996

[86] PCT No.: PCT/JP97/04449

§ 371 Date: Jul. 31, 1998

§ 102(e) Date: Jul. 31, 1998

[87] PCT Pub. No.: WO98/24648

PCT Pub. Date: Jun. 11, 1998

[30] Foreign Application Priority Data

Dec. 4, 1996 [JP] Japan ................................ 8-323681

[51] Int. Cl.$^7$ .................................................. B60H 1/02
[52] U.S. Cl. .................... 237/12.3 R; 454/75; 165/204; 165/42; 165/43
[58] Field of Search ................... 237/12.3 R, 12.3 B, 237/2 A; 165/204, 42, 43; 454/75

[56] References Cited

U.S. PATENT DOCUMENTS

| | | | |
|---|---|---|---|
| 4,760,772 | 8/1988 | Horiguchi et al. | 165/28 |
| 4,890,460 | 1/1990 | Takasi et al. | 62/180 |
| 5,016,815 | 5/1991 | Doi et al. | 236/49.3 |
| 5,199,485 | 4/1993 | Ito et al. | 165/22 |
| 5,273,105 | 12/1993 | Higashihara et al. | 165/12 |
| 5,294,050 | 3/1994 | Hoffman et al. | 237/2 A |
| 5,582,234 | 12/1996 | Samukawa et al. | 165/204 |

FOREIGN PATENT DOCUMENTS

| | | |
|---|---|---|
| 57-63711 | 4/1982 | Japan . |
| 1-115912 | 8/1989 | Japan . |

*Primary Examiner*—Harold Joyce
*Assistant Examiner*—Derek S. Boles
*Attorney, Agent, or Firm*—Davis and Bujold

[57] ABSTRACT

The heating feeling of an occupant is improved by setting the optimum time for a bi-level mode. A controller (7) switches an outlet mode to a FOOT/FACE mode (bi-level mode) if the water temperature (temperature of engine cooling water) rises to 45° C. or higher in the course of warm-up control, and the necessary blowing temperature TAO is not lower than 100° C. In the FOOT/FACE mode, the setting time (timer time) is variable depending on the outside air temperature and the presence/absence of solar radiation. Specifically, setting is done so that the lower the outside air temperature, the longer the timer time, and the higher the outside air temperature, the shorter the timer time. When solar radiation is present, the timer time is corrected in accordance with the time at which it is judged that solar radiation is present.

10 Claims, 3 Drawing Sheets

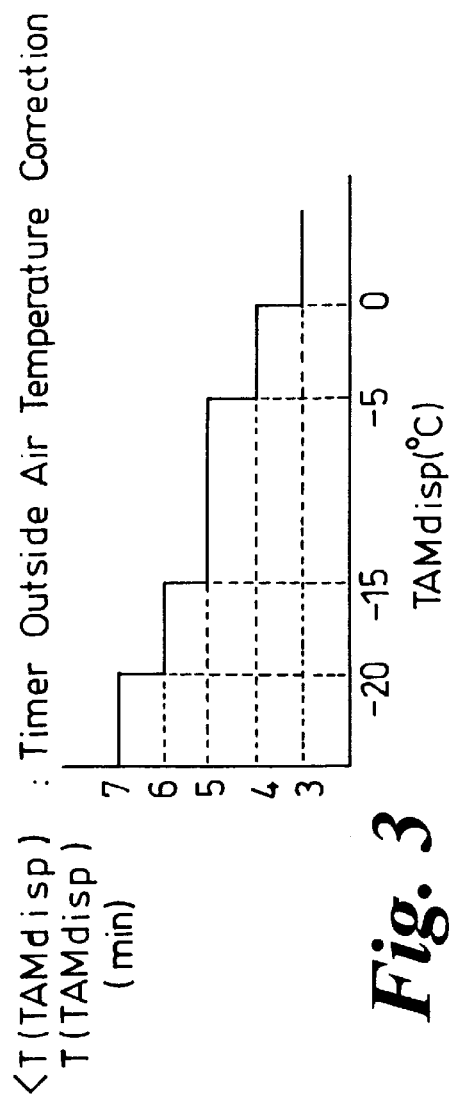

AIR CONDITIONERS FOR VEHICLES

DETAILED DESCRIPTION OF THE INVENTION

Industrial Field of Application

The present invention relates to a vehicular air conditioner which carries out so-called warm-up control for preventing the blow out of cold air when the heating operation is started.

For a vehicular air conditioner which performs heating operation by using engine cooling water as a heat source, if the heating operation is started when the cooling water temperature is still low immediately after the engine start, the air which has not been heated enough is blown out toward the occupant's feet, which gives uncomfortable feeling to the occupant. Therefore, a conventional automotive air conditioner carries out so-called warm-up control in which an outlet is switched from DEF, ie. Defrost, to FOOT/DEF to FOOT as the temperature of engine cooling water increases to prevent cold air from being blown out toward the occupant's feet. However, this warm-up control presents a problem, which is undesirable in terms of feeling, in that the upper half part of the body, especially hands are cold until the whole interior of the cabin is warmed.

As a means for solving this problem, there has been proposed a technique in which an outlet mode is switched to a bi-level mode (FACE/FOOT mode) after the water temperature reaches a value not lower than a predetermined temperature (for example, 45° C.) in the course of the warm-up control.

For example, unexamined Japanese Utility Model Publication No. 2-127508 discloses a technique in which when the setting temperature immediately after the engine start is higher than the cabin air temperature and the setting temperature is higher than the outside temperature, a whole body heating mode is set in which the air heated by a heater is blown out into a cabin not only from a foot outlet but also from centre and side outlets.

Also, unexamined Japanese Utility Model Publication No. 1-115912 discloses a technique in which after a fan is set to Low for a predetermined period of time after the engine start to set the DEF mode, the mode is switched from the DEF mode to the FOOT mode, and further from the FOOT mode to the FACE/FOOT mode as the water temperature rises.

In the above-mentioned prior art, even if the mode is switched to the bi-level mode in the course of the warm-up control, the setting time of the bi-level mode is not considered especially. Therefore, there arises a problem in that if the setting time is short, the occupant's hands cannot be warmed sufficiently, and if the setting time is long, the upper half part of occupant's body is warmed excessively, so that the occupant's face feels hot.

The present invention was made in view of the above situation, and accordingly an object thereof is to provide a vehicular air conditioner which can improve the occupant's heating feeling by setting the optimum time for the bi-level mode.

According to the means defined in claim 1, after the temperature of the heating heat source reaches a predetermined temperature during the warm-up control, an outlet mode is switched to a bi-level mode, and the operation time in the bi-level mode, and the operation time in the bi-level mode can be made variable depending on the outside air temperature. Therefore, for example, when the outside air temperature is low, the operation time in the bi-level mode can be lengthened, and when the outside air temperature is high, the operation time in the bi-level mode can be shortened. so that the optimum time for the bi-level mode can be set. Thereby, the occupant's hands can be warmed sufficiently even when the outside air temperature is low, and when the outside air temperature is high, a phenomenon that the upper half part of occupant's body is warmed excessively, so that the occupant's face feels hot can be prevented. As the heat source, engine cooling water can be used, for example, if the vehicle mounts a water-cooled engine. On an electric vehicle which does not use engine cooling water, hot water heated by a refrigerant (high-pressure refrigerant) circulating the refrigeration cycle or a high-pressure refrigerant of refrigeration cycle can be used as a heat source.

According to the means defined in claim 2, after the temperature of the heating heat source reaches a predetermined temperature during the warm-up control, an outlet mode is switched to a bi-level mode, and the operation time in the bi-level mode can be made variable depending on the quantity of solar radiation. Therefore, for example, when solar radiation is absent, the operation time in the bi-level mode can be lengthened, and when solar radiation is present, the operation time in the bi-level mode can be shortened, so that the optimum time for the bi-level mode can be set. Thereby the occupant's hands can be warmed sufficiently even when solar radiation is absent, and when solar radiation is present, a phenomenon that the upper half part of the occupant's body is warmed excessively, so that the occupant's face feels hot can be prevented.

According to the means defined in claim 3, when the necessary blowing temperature calculated in accordance with a setting temperature in a cabin, temperature in the cabin, outside air temperature, and the like is low, the control in which the bi-level mode is set can be cancelled. For example, if, after the engine is stopped once during the operation in the bi-level mode, the engine is started again immediately and the operation is carried out in the bi-level mode again, the operation time in the bi-level mode is too long, so that the occupant's face sometimes feels hot. Therefore, when the necessary blowing temperature is lower than a predetermined temperature, since it can be judged that the temperature in the cabin has already become higher than the temperature at the start of the heating operation, the phenomenon that the occupant's face feels hot can be prevented by continuing the ordinary control without setting off the bi-level mode.

The vehicular air conditioner in accordance with the present invention will be described below with reference to the accompanying drawing, in which:

FIG. 3 shows a map showing the relationship between outside air temperature and timer time; and FIG. 4 shows a correction table for timer time due to the quantity of solar radiation.

Figure 1:
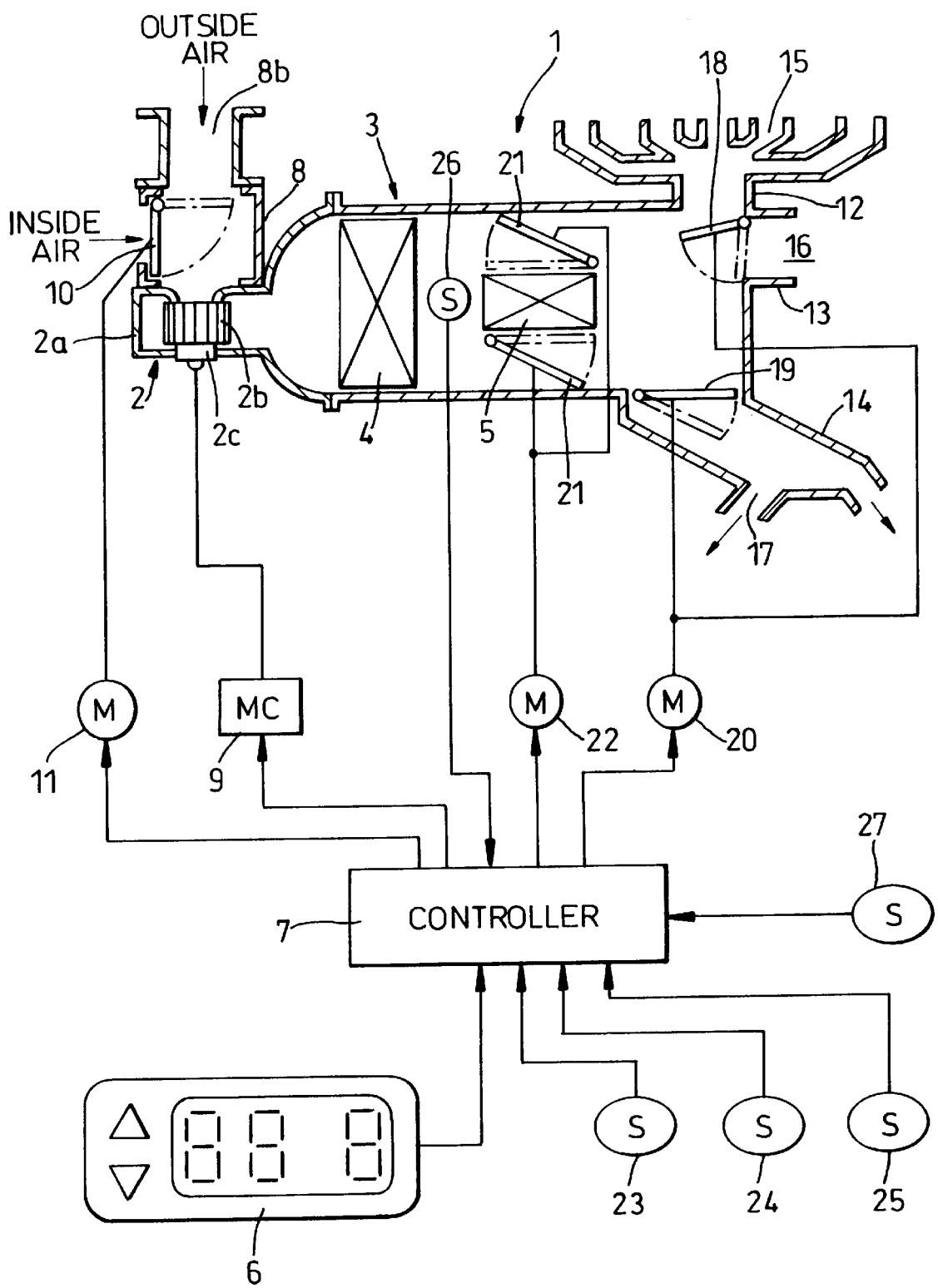
FIG. 1 shows a general schematic view of a vehicular air conditioner.

An air conditioner 1 of this embodiment includes a blower 2 for generating an air flow and a duct 3 for introducing the air sent from the blower 2 into a cabin. A cooler 4 for cooling the air and a heater 5 for heating the air are disposed in the duct 3. Also, the air conditioner 1 includes a controller (ECU) 7 for controlling the operation of each air conditioning equipment in accordance with a sensor signal sent from various sensors (described later) and an operation signal sent from a control panel 6.

The blower 2 includes a blower case 2a provided integrally with an inside/outside air switching box 8, a fan 2b housed in the blower case 2a, and a motor 2c for rotating the fan 2b. The blowing air quantity (number of revolutions of the motor 2c) is determined according to a blower voltage applied through a motor driving circuit 9.

The inside/outside air switching box 8 is formed with an inside air inlet 8a for introducing the air inside the cabin (hereinafter referred to as inside air) and an outside air inlet 8b for introducing the air outside the cabin (hereinafter referred to as outside air), and an inside/outside air switching door 10 for selectively opening and closing the inside air inlet 8a and the outside air inlet 8b is rotatably supported. The inside/outside air switching door 10, which is driven by an actuator 11 of a servomotor etc, fully opens the inside air inlet 8a (fully closes the outside air inlet 8b) when an inside air mode is selected.

The duct 3 is provided with a defroster duct 12, a face duct 13, and a foot duct 14 in a branching manner at the downstream portion thereof, and the downstream end of each duct 12, 13, 14 is connected to each outlet 15, 16, 17 opening to the cabin, respectively. Specifically, the defroster duct 12 is connected to a DEF outlet 15 for blowing out the air toward a windshield glass, the face duct 13 is connected to a FACE outlet 16 for blowing out the air toward the upper half part of occupant's body, and the foot duct 14 is connected to a FOOT outlet 17 for blowing out the air toward the occupant's feet. At the downstream portion of the duct 3 are provided outlet switching doors 18 and 19 for switching the outlets 15, 16 and 17. The outlet switching doors 18 and 19 are driven by an actuator 20 of a servomotor, etc.

The cooler 4, which is a refrigerant evaporator of refrigeration cycle, cools the air passing through the cooler 4 by heat exchange with a low-temperature refrigerant flowing in the cooler 4.

The heater, which is connected to an engine cooling water circuit (not shown) through a hot water pipe (not shown), heats the air passing through the heater 5 by using the cooling water supplied from the engine as a heat source. The heater 5 is arranged so that bypasses are formed at both sides of the heater 5. At both sides of the heater 5 are provided a set of air mix doors 21 for adjusting the ratio of the quantity of air passing through the heater 5 to the quantity of air passing through the bypasses. The air mix door 21 is driven by an actuator 22 of a servomotor, etc.

The controller 7, which is an electronic control unit incorporating a microcomputer, is operated by receiving the supply of electric power from an onboard battery when the occupant turns on an ignition switch.

The controller 7 receives a sensor signal sent from an inside air temperature sensor 23 for detecting the inside air temperature, an outside air temperature sensor 24 for detecting the outside air temperature, a solar radiation sensor 25 for detecting the quantity of solar radiation into the cabin, a behind-evaporator temperature sensor 26 for detecting the temperature of air passing through the cooler (refrigerant evaporator), a water temperature sensor 27 for detecting the temperature of engine cooling water, and the like, and an operation signal sent in accordance with the control (operation instruction) at the control panel 6, processes the received signal in accordance with a control program which has been input in advance, and sends the processed signal to a driving means for the air conditioning equipment (motor driving circuit 9, actuator 11 for driving the inside/outside air switching door 10, actuator 20 for driving the outlet switching doors 18 and 19, actuator 22 for driving the air mix door 21) as a control signal.

Figure 2:
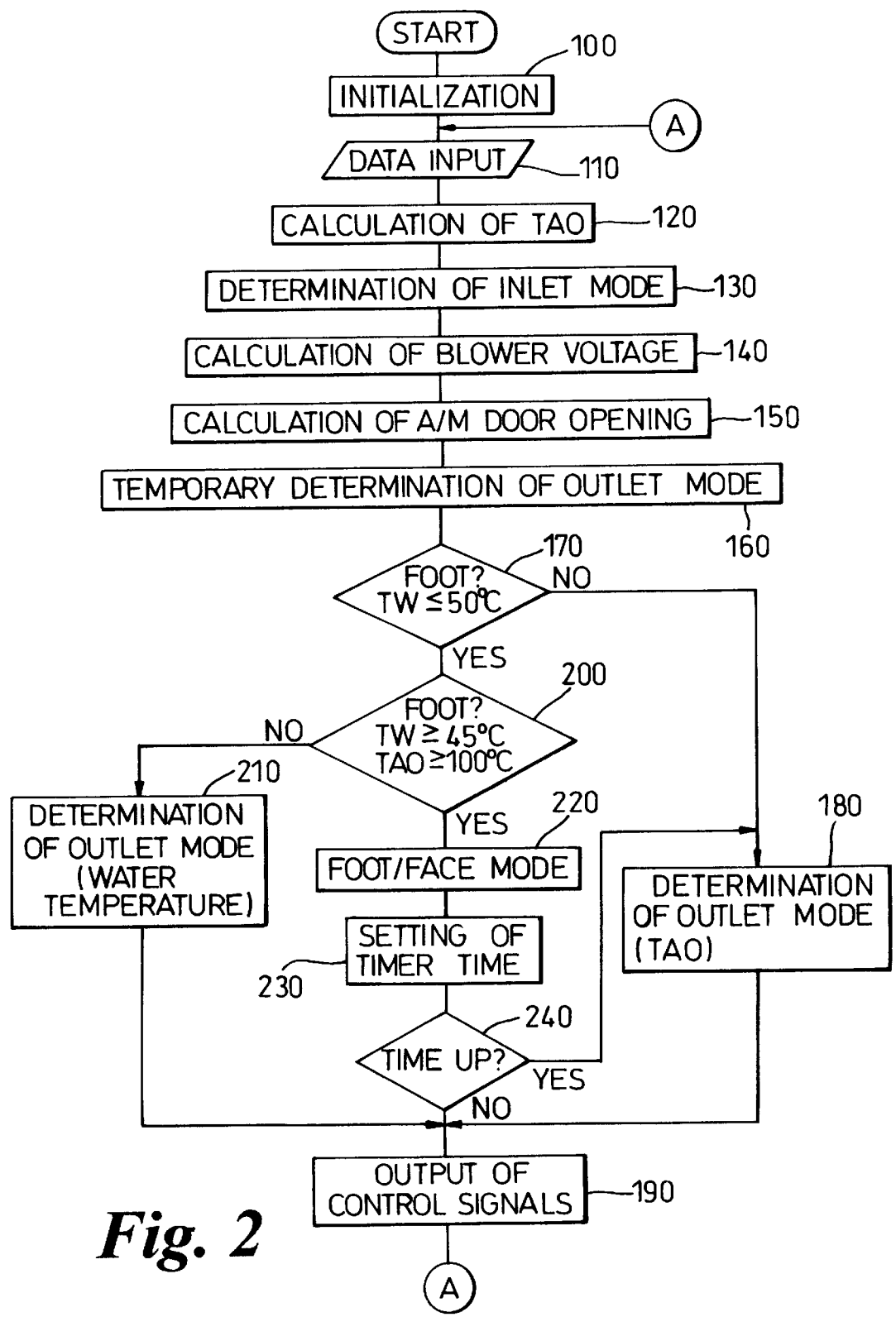
FIG. 2 shows a flowchart showing a processing procedure of a controller.

Next, the operation of this embodiment (control operation of the controller 7) will be described with reference to a flowchart shown in FIG. 2.

First, after the stored data in a data processing memory is initialised (Step 100), the setting temperature Tset set at the control panel 6 and the detection values of sensors (inside air temperature Tr, outside air temperature Tam, quantity of solar radiation Ts, behind-evaporator air temperature Te, engine cooling water temperature Tw) are read and stored in the processing memory (Step 110).

Next, a necessary blowing temperature TAO is calculated by the following equation (1) (Step 120).

$$TAO = Kset \cdot Tset - Kr \cdot Tr - Kam \cdot Tam - Ks \cdot Ts + C \qquad (1)$$

where Kset, Kr, Kam and Ks are correction gains and C is a correction constant.

Next, an inlet mode is determined in accordance with the necessary blowing temperature TAO (Step 130), and the control voltage (blower voltage) of the motor 2c is determined likewise in accordance with the necessary blowing temperature TAO (Step 140).

Next, the opening SW of the air mix door 21 is calculated in accordance with the necessary blowing temperature TAO, behind-evaporator air temperature Te, and engine cooling water temperature Tw by using the following equation (2) (Step 150).

$$SW = (TAO - Te)/(Tw - Te) \times 100 \ (\%) \qquad (2)$$

Next, an outlet mode is temporarily determined in accordance with the necessary blowing temperature TAO (Step 160).

Next, the start conditions of warm-up control are judged (Step 170).

The warm-up control means a control in which in the case where the heating operation is performed, cold air is prevented from being blown out toward the occupant's feet when the temperature of engine cooling water is still low immediately after the engine start. In this embodiment, the outlet mode is switched from DEF to FOOT/DEF to FOOT mode as the temperature of engine cooling water rises. The start conditions of the warm-up control are as follows: (1) the outlet mode temporarily determined in Step 160 is the FOOT mode; (2) the temperature Tw of engine cooling water is not higher than 50° C.; and (3) the necessary blowing temperature TAO calculated in Step 120 is not lower than 100° C.

If the judgement result is No, ie. if the warm-up control is not executed, the outlet mode (that is, the outlet mode temporarily determined in Step 160) is determined in accordance with the necessary blowing temperature TAO calculated in Step 120 (Step 180). Subsequently, the control signals are sent to driving means for the air conditioning equipment (motor driving circuit 9, actuator 11 for driving the inside/outside air switching door 10, actuator 20 for driving the outlet switching doors 18 and 19, actuator 22 for driving the air mix door 21) so that the inlet mode determined in Step 130, the blower voltage determined in Step 140, the opening SW of the air mix door 21 calculated in Step 150, and the outlet mode determined in Step 180 can be obtained (Step 190).

On the other hand, if the judgement result in Step 170 is Yes, the start conditions of timed FEET control is judged (Step 200). The timed FEET control means a control for improving the heating feeling during the warm-up control. In this embodiment, when the temperature of engine cooling water reaches 45° C. or higher, the outlet mode is switched to the FOOT/FACE mode (bi-level mode). The start conditions of the timed FEET control are as follows: (1) the outlet mode temporarily determined in Step 160 is the FOOT mode; (2) the temperature Tw of engine cooling water is not lower than 45° C.; and (3) the necessary blowing temperature TAO calculated in Step 120 is not lower than 100° C.

If the judgement result is No, the outlet mode is determined in accordance with the relationship between the water temperature (temperature of engine cooling water) having set in advance and the outlet (Step 210).

Subsequently, the control signals are sent to the driving means for the air conditioning equipment so that the inlet mode determined in Step 130, the blower voltage determined in Step 140, the opening SW of the air mix door 21 calculated in Step 150, and the outlet mode determined in Step 210 can be obtained (Step 190).

On the other hand, if the judgement result in Step 200 is Yes, ie. if the timed FEET control is executed, the outlet mode is determined to be the FOOT/FACE mode (Step 220).

Subsequently, the timer time (time period of FOOT/FACE mode) of the timed FEET mode is set (Step 230). This timer time is temporarily determined by using a map (see FIG. 3) having been stored in the microcomputer in advance, and then determined by being corrected by the presence/absence of solar radiation. The map represents the relationship between the outside air temperature Tamdisp and the timer time T (Tamdisp) as shown in FIG. 3. According to this map, the lower the outside air temperature, the longer the timer time. The outside air temperature Tamdisp is a value obtained by correcting the detection value of the outside air temperature sensor 24.

The timer time T(Tamdisp) determined from the map is determined as it is as the timer time T(=T(Tamdisp)) of the timed FEET control if the solar radiation is absent. If the solar radiation is present, a coefficient H and a correction time T(TSave) is determined in accordance with the time judged to be "solar radiation present" (judged for each 60 seconds) from the table shown in FIG. 4, and the timer time T after correction is calculated by substituting the coefficient H, correction time T(TSave), and the timer time T(Tamdisp) determined from the map into the following equation (1).

$$T=T(TSave)+\{(T(Tam)-T(TSave)\}\times H \quad (1)$$

The presence/absence of solar radiation is judged to be "solar radiation present" if the average quantity Ts of solar radiation for 60 seconds is not smaller than 0.3 Kw/m, and judged to be "solar radiation absent" if the average quantity Ts of solar radiation for 60 seconds is smaller than 0.3 Kw/m.

After the timer time T is set, it is judged whether or not the set timer time has elapsed (Step 240). If the time is not up (judgement result is No), the control signals are sent to the driving means for the air conditioning equipment so that the inlet mode determined in Step 130, the blower voltage determined in Step 140, the opening SW of the air mix door 21 calculated in Step 150, and the outlet mode determined in Step 210 can be obtained (Step 190). If the time is up (judgement result is Yes), the timed FEED control ends, and the control flow proceeds to Step 180.

According to this embodiment, after the temperature of engine cooling, water reaches 45° C. or higher during the warm-up control, the outlet mode is switched to the bi-level mode (FOOT/FACE mode), and the operation time in the bi-level mode can be variable depending on the outside air temperature and the presence/absence of solar radiation. Therefore, since the optimum time in the bi-level mode can be set, the occupant's hands can be warmed sufficiently even when the outside air temperature is low, and a phenomenon that the upper half part of occupant's body is warmed excessively, so that the occupant's face feels hot can be prevented.

Even if the water temperature reaches 45° C. or higher during the warm-up control, the timed FEET control can be cancelled when the necessary blowing temperature TAO is lower than 100° C. If, after the engine is stopped once during the timed FEET control, the engine is started again immediately and the timed FEET control is executed again, the operation time in the bi-level mode is too long, so that the occupant's face sometimes feels hot. Therefore, when the necessary blowing temperature is lower than 100° C., since it can be judged that the temperature in the cabin has become higher than the temperature at the start of the heating operation, the phenomenon that the occupant's face feels hot can be prevented by continuing the ordinary control without setting of the bi-level mode.

Although, when the start conditions of the warm-up control are satisfied, the outlet mode is switched from DEF to FOOT/DEF to FOOT according to the rise of water temperature in this embodiment, a blower control may be used together with the outlet control. For example, the operation of the blower 2 is stopped until the water temperature reaches a predetermined temperature, and when the water temperature reaches the predetermined temperature, the blower voltage is increased with increasing water temperature, by which the quantity of blown air is increased.

What is claimed is:

1. A vehicular air conditioner for blowing air into a cabin of a vehicle, the vehicular air conditioner comprising:

a blower for supplying blow air to the vehicular air conditioner;

a foot outlet and a face outlet being coupled to the blower, and each of the foot outlet and the face outlet selectively blows out air into the cabin of the vehicle;

the vehicular air conditioner including a heat source for performing a heating operation on said blow out air prior to exiting from one of the foot outlet and the face outlet;

a controller for controlling the discharge of blow out air from said foot outlet and the face outlet; and said controller carrying out a warm-up control in which said controller prevents air from being blown out of said foot outlet from a time when said heating operation is started until a time when a temperature of said heat source reaches a certain temperature, and said controller switching, after said certain temperature is reached by said heat source, to operation of said foot outlet and the face outlet in a bi-level mode in which said blow out air is blown out from both of said foot outlet and said face outlet;

wherein said controller then maintains operation in said bi-level mode so that the blow out air is blown out from both of said foot outlet and said face outlet for a time period, the length of which time period is variable.

2. The vehicular air conditioner according to claim 1, wherein said controller calculates a blowing temperature for said blow out air and, even if the temperature of said heat source reaches said certain temperature, cancels said foot outlet from blowing out air if an actual blowing temperature is below said calculated blowing temperature.

3. The vehicular air conditioner according to claim 1, wherein said air conditioner further comprises an outside temperature sensor for supplying a signal to the controller indicative of a temperature outside the cabin and the length of said time period is varied in dependence on said temperature outside the cabin.

4. The vehicular air conditioner according to claim 1, wherein said air conditioner further comprises a solar radiation sensor for supplying a signal to said controller indicative of a quantity of solar radiation and the length of said time period is varied in dependence on said quantity of solar radiation.

5. The vehicular air conditioner according to claim 1, wherein said air conditioner further comprises a control panel for setting a setting temperature for said cabin, and said controller calculates a necessary blowing temperature for said blow out air and cancels operation in said bi-level mode if said necessary blowing temperature is lower than said setting temperature.

6. A vehicular air conditioner for blowing air into a cabin of a vehicle, the vehicular air conditioner comprising:

a blower for supplying blow air to the vehicular air conditioner, and the blower having an inlet for receiving air from one of an interior of the cabin and an exterior of the cabin;

a foot outlet and a face outlet both being coupled to the blower for receiving blow air from the blower, and each of the foot outlet and the face outlet selectively blows out air into a designated portion of the cabin;

the vehicular air conditioner including a heat source for performing a heating operation on said blow out air prior to the blow out air exiting from one of the foot outlet and the face outlet;

a controller controlling discharge of the blow out air exiting from said foot outlet and the face outlet; and said controller carrying out a warm-up control in which said controller prevents air from being blown out of said foot outlet from a time when said heating operation is started until a time when a temperature of said heat source reaches a certain temperature, and said controller switching, after said certain temperature is reached by said heat source, to operation of said foot outlet and the face outlet in a bi-level mode in which said blow out air is blown out from both of said foot outlet and said face outlet; and said controller then maintaining operation of the vehicular air conditioner in said bi-level mode so that the blow out air is blown out from both of said foot outlet and said face outlet for a time period, the length of which time period is variable.

7. The vehicular air conditioner according to claim 6, wherein said controller calculates a blowing temperature for said blow out air and, even if the temperature of said heat source reaches said certain temperature, cancels said foot outlet from blowing out air if an actual blowing temperature is below said calculated blowing temperature.

8. The vehicular air conditioner according to claim 6, wherein said air conditioner further comprises an outside temperature sensor for supplying a signal to the controller indicative of a temperature outside the cabin and the length of said time period is varied in dependence on said temperature outside the cabin.

9. The vehicular air conditioner according to claim 6, wherein said air conditioner further comprises a solar radiation sensor for supplying a signal to said controller indicative of a quantity of solar radiation and the length of said time period is varied in dependence on said quantity of solar radiation.

10. The vehicular air conditioner according to claim 6, wherein said air conditioner further comprises a control panel for setting a setting temperature for said cabin, and said controller calculates a necessary blowing temperature for said blow out air and cancels operation in said bi-level mode if said necessary blowing temperature is lower than said setting temperature.

* * * * *

UNITED STATES PATENT AND TRADEMARK OFFICE
CERTIFICATE OF CORRECTION

PATENT NO. : 6,123,267
DATED : Sep. 26, 2000
INVENTORS : Roger Keith BAKER and Teruhisa TANAKA It is certified that error appears in the above-identified patent and that said Letters Patent is hereby corrected as shown below:

Column 1, front page, line [22] replace "PCT Filed: Dec. 4, 1996" with "PCT Filed: Dec. 4, 1997"

Signed and Sealed this

Fifteenth Day of May, 2001

*Attest:*

NICHOLAS P. GODICI

*Attesting Officer*  *Acting Director of the United States Patent and Trademark Office*